(12) United States Patent
Nagaura et al.

(10) Patent No.: US 8,433,832 B2
(45) Date of Patent: Apr. 30, 2013

(54) CONTROL EQUIPMENT WITH COMMUNICATION APPARATUS

(75) Inventors: Wataru Nagaura, Hitachinaka (JP); Kenji Ohta, Hitachinaka (JP); Kouichi Sato, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/917,563

(22) Filed: Nov. 2, 2010

(65) Prior Publication Data

US 2011/0047308 A1 Feb. 24, 2011

Related U.S. Application Data

(63) Continuation of application No. 11/775,357, filed on Jul. 10, 2007, now Pat. No. 7,849,236.

(30) Foreign Application Priority Data

Jul. 11, 2006 (JP) ................................. 2006-189946

(51) Int. Cl.
*G06F 13/00* (2006.01)

(52) U.S. Cl.
USPC ............................................. 710/33; 710/260

(58) Field of Classification Search ............ 710/33, 710/14
See application file for complete search history.

(56) References Cited

U.S. PATENT DOCUMENTS

| | | | |
|---|---|---|---|
| 6,681,346 B2 * | 1/2004 | James et al. .................... 714/42 |
| 6,684,862 B2 | 2/2004 | Oyama et al. | |
| 6,880,530 B2 | 4/2005 | Oyama et al. | |
| 7,248,588 B2 * | 7/2007 | Heuer ....................... 370/395.31 |
| 8,065,026 B2 * | 11/2011 | Beckert et al. .................. 700/94 |
| 2002/0133645 A1 * | 9/2002 | Ku ................................. 710/22 |
| 2005/0193260 A1 | 9/2005 | Kato | |

FOREIGN PATENT DOCUMENTS

| | | |
|---|---|---|
| JP | 6-261099 A | 9/1994 |
| WO | WO 96/35286 A1 | 11/1996 |

OTHER PUBLICATIONS

Andrew S. Tanenbaum, Structured Computer Organization, 1984, Prentice-Hall Inc., Second Edition, pp. 10-11.*
Oliver Maquelin, Polling Watchdog: Combining Polling and Interrupts for Efficient Message Handling, 1996, ACM 0-89791-786-3/96/0005.
Silicon Storage Technology, Inc., FlashFlex51 Microcontroller Single Master Multi-Slave Serial Peripheral Interface, Application Notes Jun. 2003, Silicon Storage Technology, Inc.
Silicon Storage Technology, FlashFlex51 MCU, SSST89E564RD/SST89V564RD/SST89E554RC/SST89V554RC, Mar. 2002, Preliminary Specification, Silicon Storage Technology.
European Search Report dated Sep. 26, 2007.

* cited by examiner

*Primary Examiner* — Elias Mamo
(74) *Attorney, Agent, or Firm* — Crowell & Moring LLP

(57) ABSTRACT

A control equipment with a built-in communication apparatus is provided which realizes a delay required for communication without a software intervention while at the same time reducing a load of the communication processing. The control equipment with a communication apparatus includes: a communication device to communicate with a plurality of destinations; and a decision device to determine a mode requiring a reception completion interrupt and a mode not requiring the reception completion interrupt. If the decision device decides that the reception completion interrupt is not necessary, the communication device transmits data to one or more destinations and also virtually transmits data to a second destination different from the first intended destination.

8 Claims, 16 Drawing Sheets

JOB-FUNCTION CORRESPONDENCE TABLE

| SPI_2 JOB-FUNCTION CORRESPONDENCE TABLE | | |
|---|---|---|
| JOB | TRANSMISSION | RECEPTION |
| DIAGNOSTIC 1 | Send DIAGNOSTIC 1 | Rx DIAGNOSTIC 1 |
| DIAGNOSTIC 2 | Send DIAGNOSTIC 2 | Rx DIAGNOSTIC 2 |

| SPI_1 JOB-FUNCTION CORRESPONDENCE TABLE | | |
|---|---|---|
| JOB | TRANSMISSION | RECEPTION |
| MIB | Send MICROCOMPUTER-B | Rx MICROCOMPUTER-B |

| table1 | |
|---|---|
| d0 | VIRTUAL_A |
| d1 | VIRTUAL_A |
| d2 | IC_A |
| d3 | IC_B |

FIG.7B

| table2 | |
|---|---|
| e0 | VIRTUAL_A |
| e1 | VIRTUAL_A |
| e2 | IC_A |
| e3 | IC_B |
| e4 | VIRTUAL_A |
| e5 | IC_A |
| e6 | IC_B |
| e7 | VIRTUAL_A |
| e8 | IC_A |
| e9 | IC_B |
| e10 | VIRTUAL_A |
| e11 | IC_A |
| e12 | IC_B |
| e13 | VIRTUAL_A |
| e14 | IC_A |
| e15 | IC_B |
| e16 | VIRTUAL_A |
| e17 | IC_A |
| e18 | IC_B |
| e19 | VIRTUAL_A |
| e20 | IC_A |
| e21 | IC_B |
| e22 | VIRTUAL_A |
| e23 | IC_A |
| e24 | IC_B |
| e25 | VIRTUAL_A |
| e26 | IC_A |
| e27 | IC_B |
| e28 | VIRTUAL_A |
| e29 | IC_A |
| e30 | IC_B |

CONTROL EQUIPMENT WITH COMMUNICATION APPARATUS

CROSS REFERENCE TO RELATED APPLICATIONS

This application is a continuation of U.S. patent application Ser. No. 11/775,357, filed on Jul. 10, 2007, which claims priority under 35 U.S.C. §119 to Japanese Patent Application No. 2006-189946, filed Jul. 11, 2006, the entire disclosures of which are herein expressly incorporated by reference.

BACKGROUND OF THE INVENTION

The present invention relates to a control equipment to control an actuator based on external states transmitted from sensors through a network, and more particularly to a control equipment with a communication apparatus between microcomputers built into the control equipment and peripheral ICs.

An automotive engine control equipment controls an amount of fuel supply and fuel injection timings according to input signals such as a crank angle sensor signal. The engine control, as it becomes more sophisticated in function, is required to be performed using a growing number of pieces of information, which means that the number of input/output signals is increasing. An engine control equipment with built-in microcomputers is provided with a limited number of input/output signals because of cost limitations. Therefore if the number of input/output signals required to be handled is greater than that of the microcomputer itself, it is common practice in recent years to control the output by the microcomputer communicating with peripheral ICs. Further, associated laws and regulations in recent years require that the control equipment be provided with a diagnostic function. So, the control equipment has come to communicate with these ICs, that have their own diagnostic functions, to obtain diagnostic information. With the above configuration of the control equipment, the likelihood of the communication processing influencing software load has increased. JP-A-6-261099 discloses a configuration that aims to reduce the load of the communication processing by switching between a mode requiring a communication interrupt and a mode not requiring it. As to a communication protocol, some control equipments use SPI (Serial Peripheral Interface) protocol (U.S. Pat. No. 6,880,530 B2 and U.S. Pat. No. 6,684,862 B2). The SPI communication is a master-slave type serial communication protocol characterized in that master and slave data are exchanged in synchronism with clock.

The control equipment described in JP-A-6-261099 normally operates in a mode not requiring the communication interrupt and, during a large-volume data communication, switches to a mode requiring the communication interrupt. At the end of the communication the control equipment returns to the mode not requiring the communication interrupt. This configuration has a drawback that, when the communication in a mode requiring the interrupt occurs in succession, unnecessary switching takes place. Further, in communicating with a plurality of destinations, the control equipment produces an interrupt to execute reception processing before establishing communication with a different destination. This requires an interrupt to be produced each time the communication destination is changed.

SUMMARY OF THE INVENTION

To solve these problems, the present invention provides a control equipment with the following configuration.

The control equipment comprises a communication means to communicate with a plurality of communication destination devices; and a decision means to determine a mode requiring a reception interrupt and a mode not requiring the reception interrupt; wherein, if the decision means decides that the reception interrupt is not necessary, transmission data is sent to one or more communication destination devices and at the same time is also virtually sent to a second communication destination device different from the first one.

With this invention the load of the communication processing can be reduced and at the same time a communication delay based on hardware restrictions can be generated without intervention of software.

Other objects, features and advantages of the invention will become apparent from the following description of the embodiments of the invention taken in conjunction with the accompanying drawings.

BRIEF DESCRIPTION OF THE DRAWINGS

FIGS. 6A and 6B are job function correspondence tables.

FIGS. 7A and 7B are transmission tables.

DESCRIPTION OF THE EMBODIMENTS

A control equipment with a built-in communication function that can reduce the load of communication processing without changing the hardware configuration by making improvements on software is realized.

[Embodiment 1]

Figure 1:
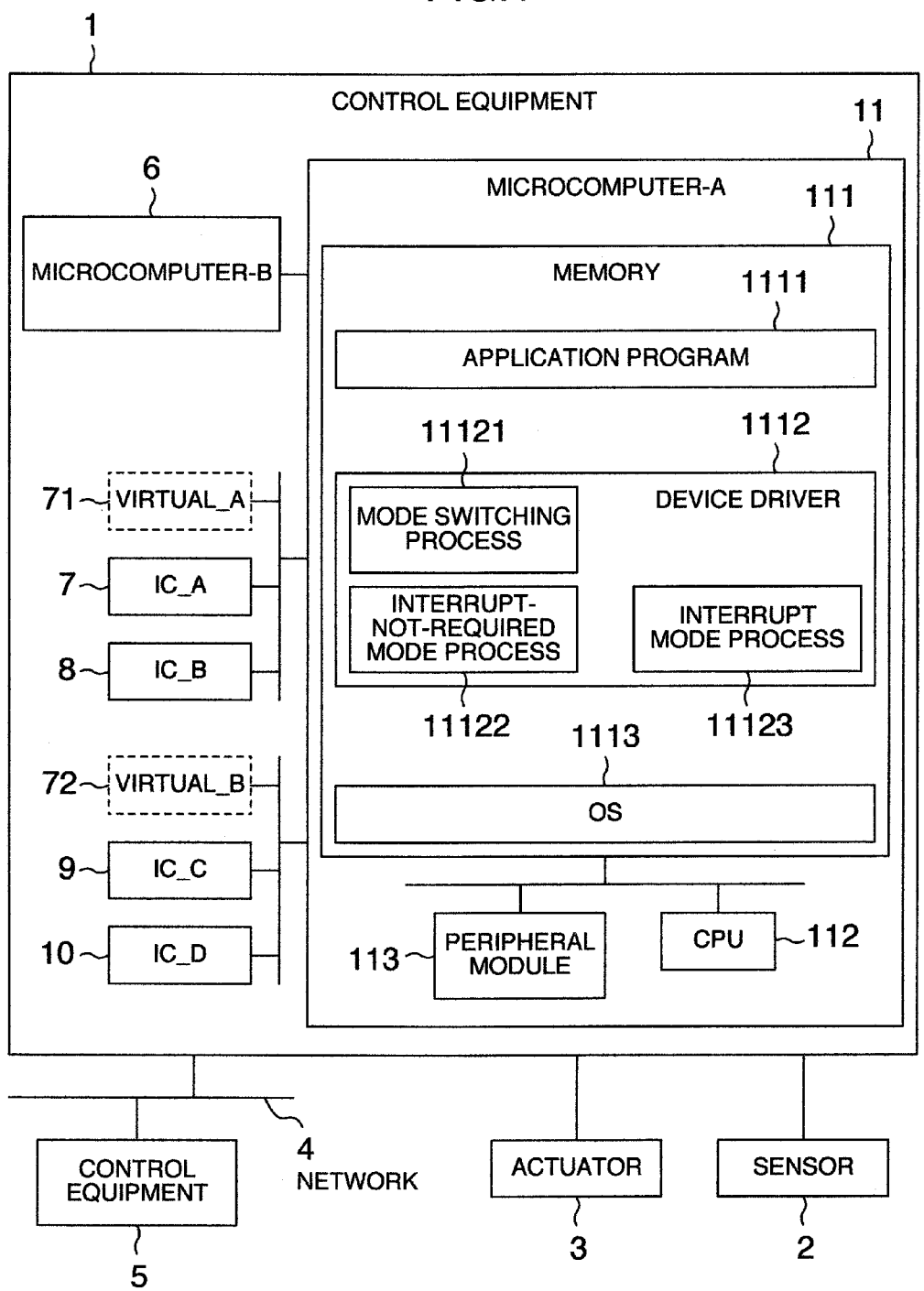
FIG. 1 is a schematic diagram showing a configuration of the control equipment.

FIG. 1 shows a configuration of the control equipment. The control equipment 1 is connected with a sensor 2 and an actuator 3 and also connected through a network 4 to other control equipment 5. Two or more sets of sensor 2, actuator 3, network 4 and other control equipment 5 may be provided. The control equipment 1 includes a microcomputer-A 11, a microcomputer-B 6, IC_A 7, IC_B 8, IC_C 9 and IC_D 10. Further, although ports are shown to connect to a virtual_A 71 and a virtual_B 72, the virtual_A 71 and virtual_B 72 do not physically exist. The microcomputer-A 11 has a memory 111, a CPU 112 and a peripheral module 113. Through the peripheral module 113 the microcomputer-A 11 is connected to the network 4, sensor 2, actuator 3, microcomputer-B 6, IC_A 7, IC_B 8, IC_C 9 and IC_D 10. The memory 111 has an application program 1111, a device driver 1112 and an OS 1113. For the SPI communication, the device driver 1112 has a mode switching process 11121, an interrupt-not-required mode process 11122 and an interrupt mode process 11123.

Figure 2:
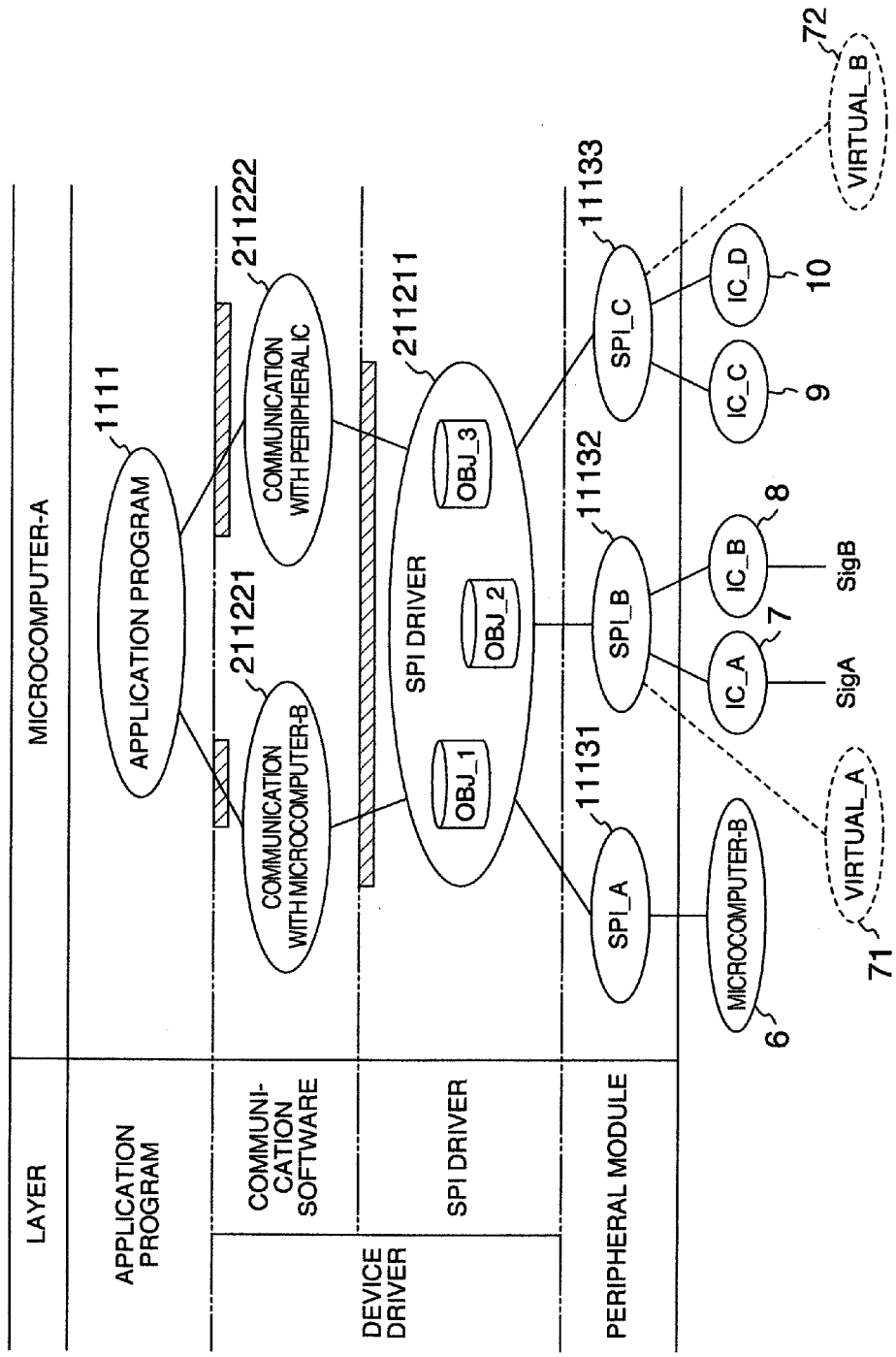
FIG. 2 is a schematic diagram showing a configuration of a communication unit of a device driver.

FIG. 2 is a functional diagram associated with an SPI communication software unit of the device driver 1112 of the microcomputer-A 11. The device driver comprises communication software and an SPI driver. An application program hands a request to the communication software. The communication software, according to the request given, identifies the device to communicate with, from among the microcomputer-B, IC_A 7, IC_B 8, IC_C 9 and IC_D 10, and then communicates with the identified device. The peripheral module SPI_A 11131 is connected to the microcomputer-B 6, the peripheral module SPI_B 11132 is connected to the IC_A 7, IC_B 8 and virtual_A 71, and the peripheral module SPI_C 11133 is connected to the IC_C 9, IC_D 10 and virtual_B 72. The virtual_A 71 and virtual_B 72 do not exist physically.

Figure 3:
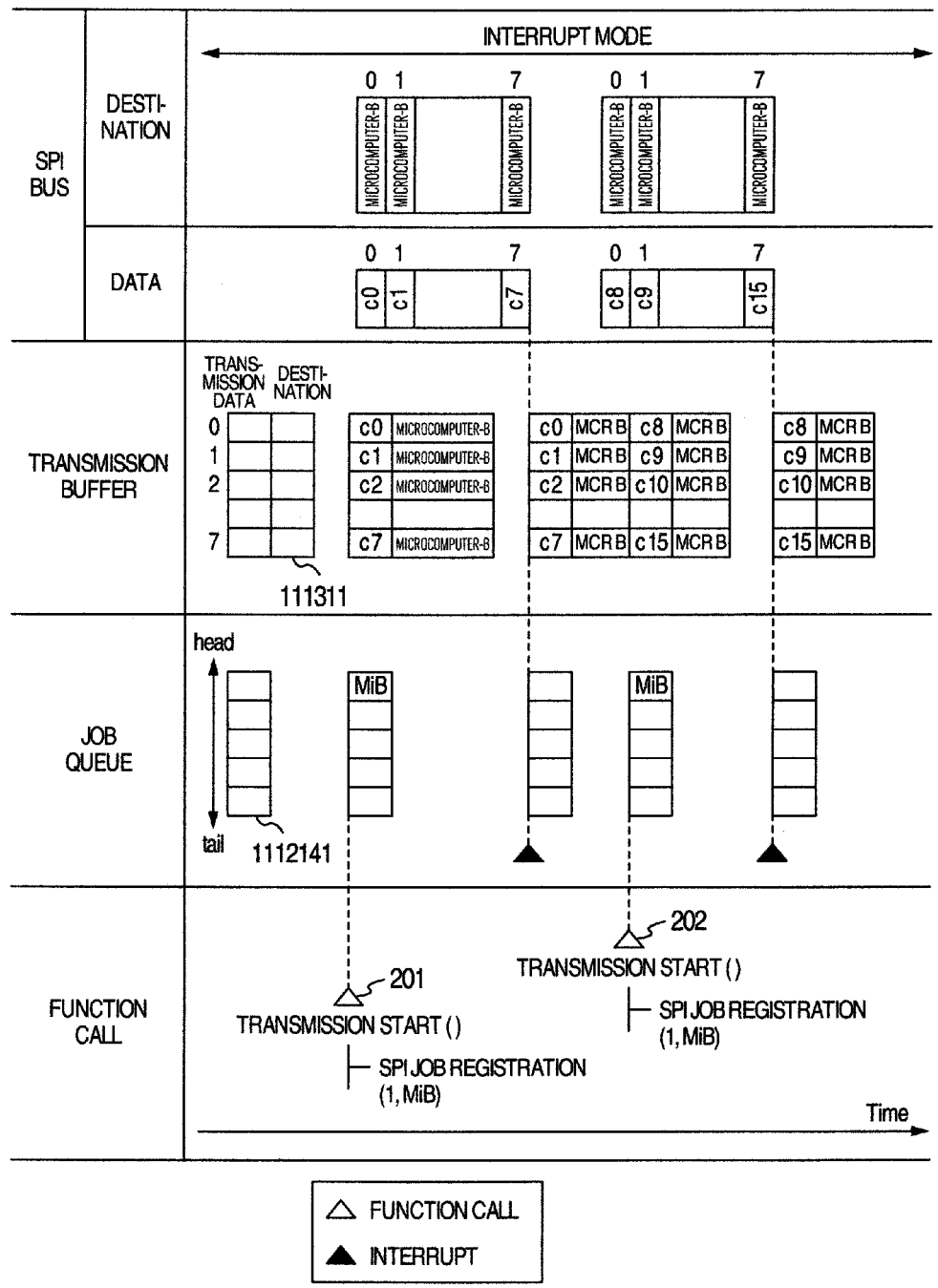
FIG. 3 is a communication timing chart without an interrupt-not-required mode.

FIG. 3 shows a flow of processing for transmission to the microcomputer-B 6. When the application program issues a request in the form of an event 201 using a transmission start function, the communication software registers the request with a job queue. The job registered with the job queue is processed by the SPI driver to start the transmission process corresponding to the job name. FIGS. 6A and 6B show a job-function correspondence table 111213. A transmission function corresponding to the job MiB 1112137 is Send Microcomputer-B, which sets data C0-C7 and a transmission destination and then starts transmission. When the transmission is complete, a transmission completion interrupt starts an SPI driver interrupt handler, which in turn starts an Rx Microcomputer-B that executes a reception operation for the job MiB. At event 202 the similar processing to that of event 201 is executed, with C8 to C15 set as the transmission data. In the figure, "McrB" represents the microcomputer-B.

Figure 4:
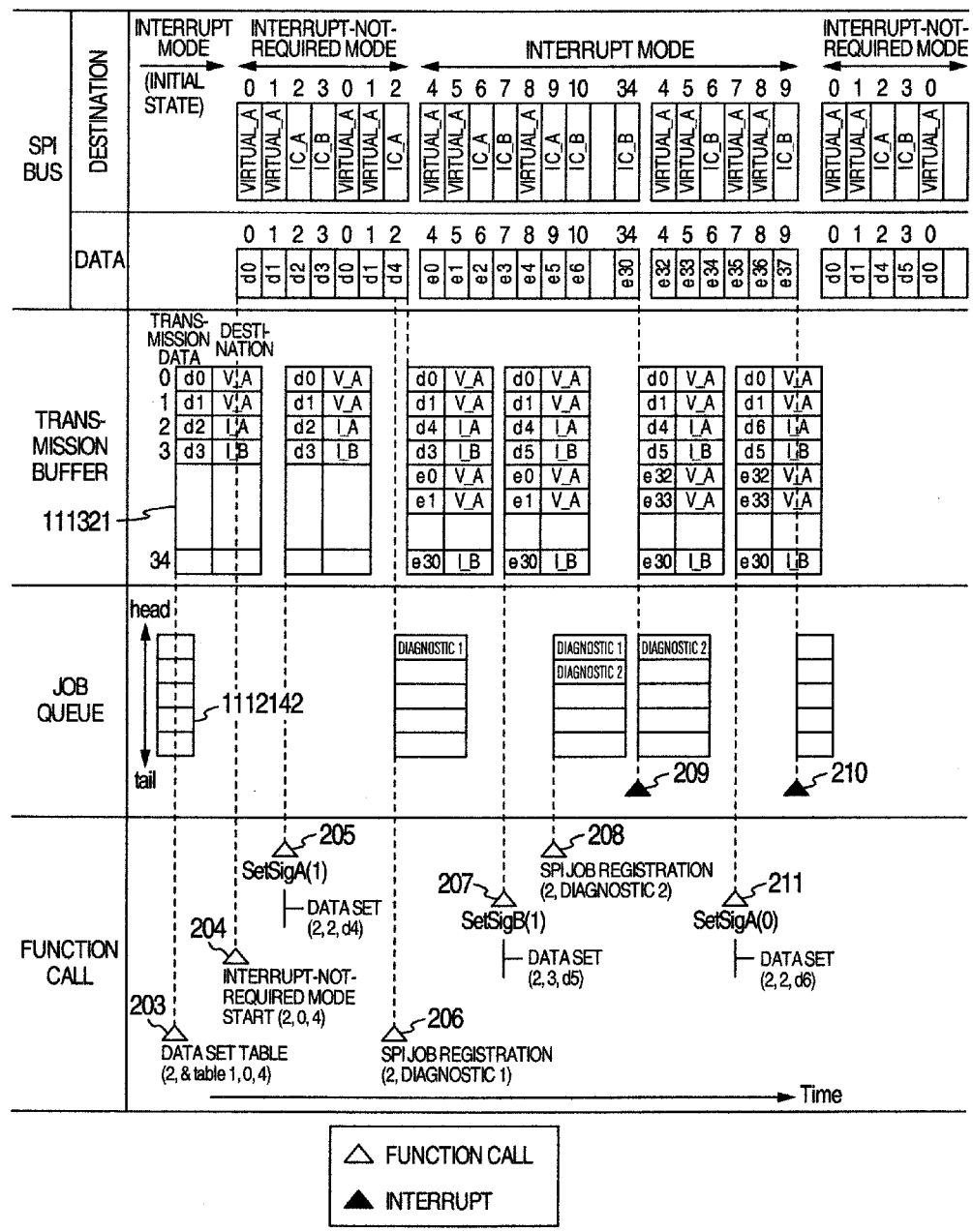
FIG. 4 is a communication timing chart for switching between an interrupt-not-required mode and an interrupt mode.

FIG. 4 shows a flow of communication that requires switching between the interrupt-not-required mode and the interrupt mode. An initial state is an interrupt mode. At event 203 a transmission buffer is set with d0 to d3 as transmission data and with virtual_A, IC_A and IC_B as destinations. At event 204, an interrupt-not-required mode start function causes indices 0 to 3 of the transmission buffer to be transmitted repetitively. At event 205 there is a request to set the value of signal SigA to 1. A data setting function sets data d4 using the SigA value of 1. At event 206, when there is a request for diagnostic, Job Diagnostic 1 is set in the job queue. An SPI job registration function switches the mode from the interrupt-not-required mode to the interrupt mode and starts Send Diagnostic 1, the transmission function for the registered Job Diagnostic 1. The Send Diagnostic 1 sets transmission data e0-e30 with virtual_A, IC_A and IC_B as destinations, as shown in Table 2 in FIG. 7B. IC_A and IC_B are required to have their communications separated more than a predetermined delay time apart. In this embodiment, the delay time is assumed to be able to be created by using two transmission durations. Here, the first two transmissions are set with virtual_A as the destination and the third transmission is set with a destination of IC_A. The reason that two transmissions in which IC_A does not receive are provided is that if the previous communication has ended with the transmission to IC_A and if a new transmission is immediately initiated to the same IC_A, the required delay time fails to be secured.

Although at event 208 there is an entry of a separate Job Diagnostic 2, since Job Diagnostic 1 is currently being transmitted, the transmission of Job Diagnostic 2 is not initiated at this timing. After the reception operation of Job Diagnostic 1 is finished, Job Diagnostic 1 is taken out of the job queue and the next Job Diagnostic 2 is processed. At this time, the transmission operation for Job Diagnostic 2 is started to set and transmit data e32-e37. At the end of the transmission, the SPI driver starts the reception operation for Job Diagnostic 2. With Job Diagnostic 2 completed, the mode changes to the interrupt-not-required mode as there are no requested jobs. In this mode, the indices 0-3 of the transmission buffer are repetitively transmitted as described before. At event 207, there is a request to set the value of signal SigB to 1, so data d5 that causes the signal SigB value to become 1 is set. At event 211 there is a request to set the value of SigA to 0, so data d6 that causes the SigA value to become 0 is set.

As described above, in the interrupt-not-required mode since a completion interrupt is prevented by hardware repetitively transmitting data, unnecessary reception operation is not started. Further, a delay can be generated by hardware transmitting the data to a virtual device, thus reducing the load of software. Also, when it is desired to change the transmission data, it can be done simply by changing the transmission data in the transmission buffer. When it is desired to cancel the transmission to IC_A, this can be done by changing the destination from IC_A to a virtual device. The transmission buffer used in the interrupt mode avoids a buffer area used by the interrupt-not-required mode. This allows the data, which is to be transmitted in the interrupt-not-required mode, to be updated irrespective of the mode, even during the interrupt mode, as with event 207 and event 211. In the figure, V_A represents Virtual_A; I_A represents IC_A; and I_B represents IC_B.

Figure 5A:
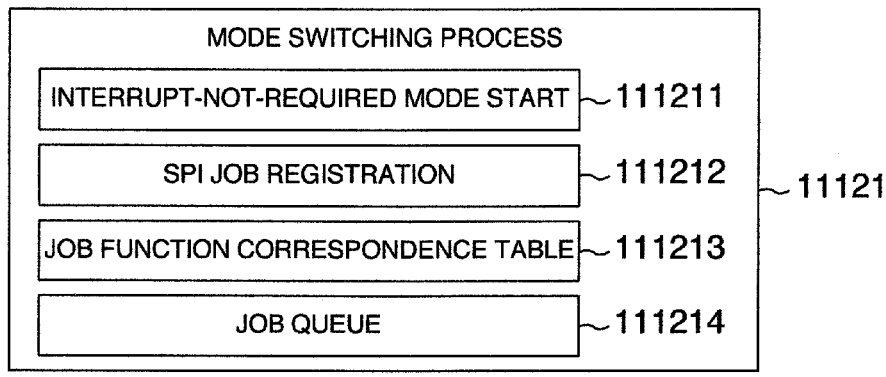
FIGS. 5A, 5B and 5C are SPI driver configuration tables.
Figure 5B:
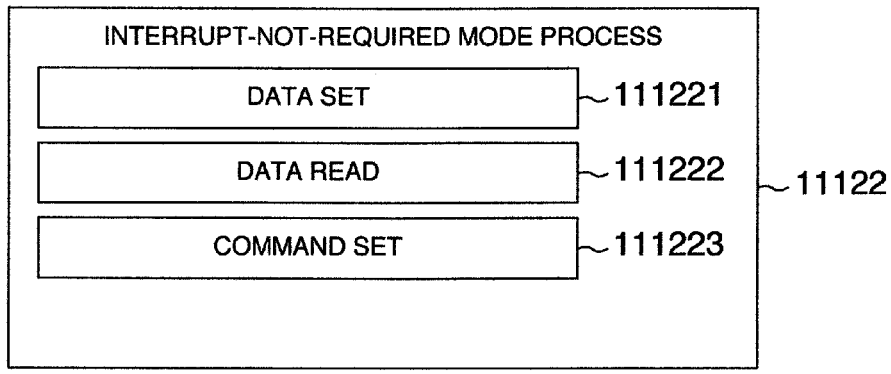
Figure 5C:
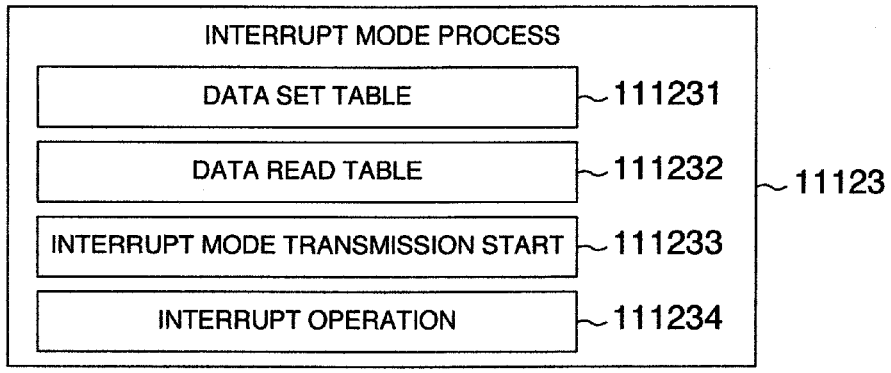

FIGS. 5A and 5B show functions and data provided by the SPI driver. The mode switching process 11121 comprises an interrupt-not-required mode start 111211, an SPI job registration 111212, a job function correspondence table 111213, and a job queue 111214. The interrupt-not-required mode process 11122 comprises a data set 111221, a data read 111222, and a command set 111223. The interrupt mode process 11123 comprises a data set table 111231, a data read table 111232, an interrupt mode transmission start 111233, and an interrupt operation 111234.

FIGS. 6A and 6B show the job function correspondence table 111213 for SPI_1 and SPI_2.

FIGS. 7A and 7B show tables to update the transmission buffer. Table 1 (FIG. 7A) represents the content of a table used by event 203 of FIG. 4. Table 2 (FIG. 7B) represents the content of a table used by event 206. Looking at the transmission destination of IC_A, it is seen that a delay of two transmissions or more is provided between the destinations by sending data to other devices. The same also applies to IC_B.

Figure 8:
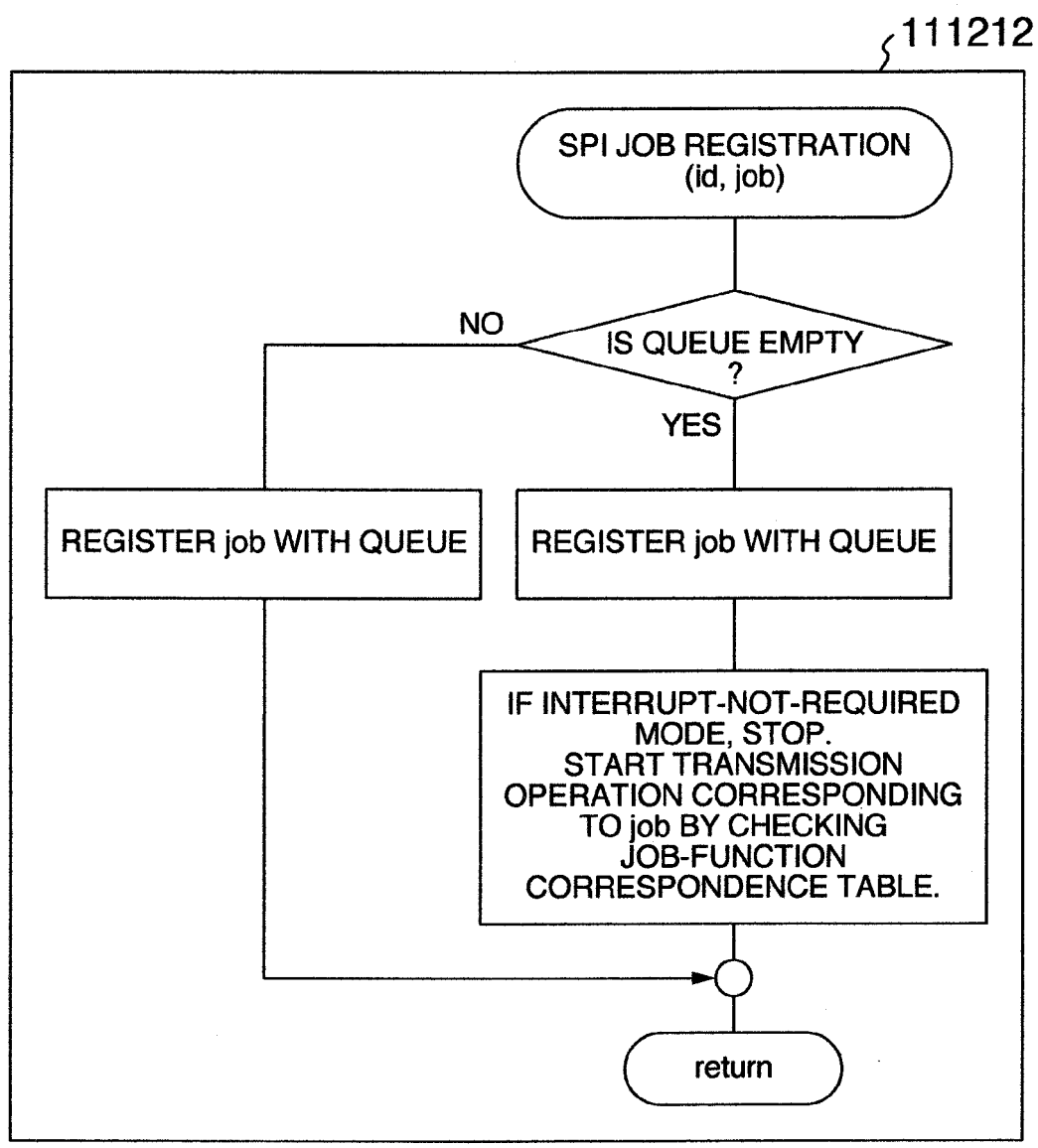
FIG. 8 is a processing flow in an SPI job registration.

FIG. 8 shows a processing flow of the SPI job registration. If the job queue is empty, a job is registered with the job queue and the transmission operation is started. At this time, if the interrupt-not-required mode is active, the mode is switched to the interrupt mode. If the jog queue is not empty, the job is registered with the job queue and the processing is ended.

Figure 9:
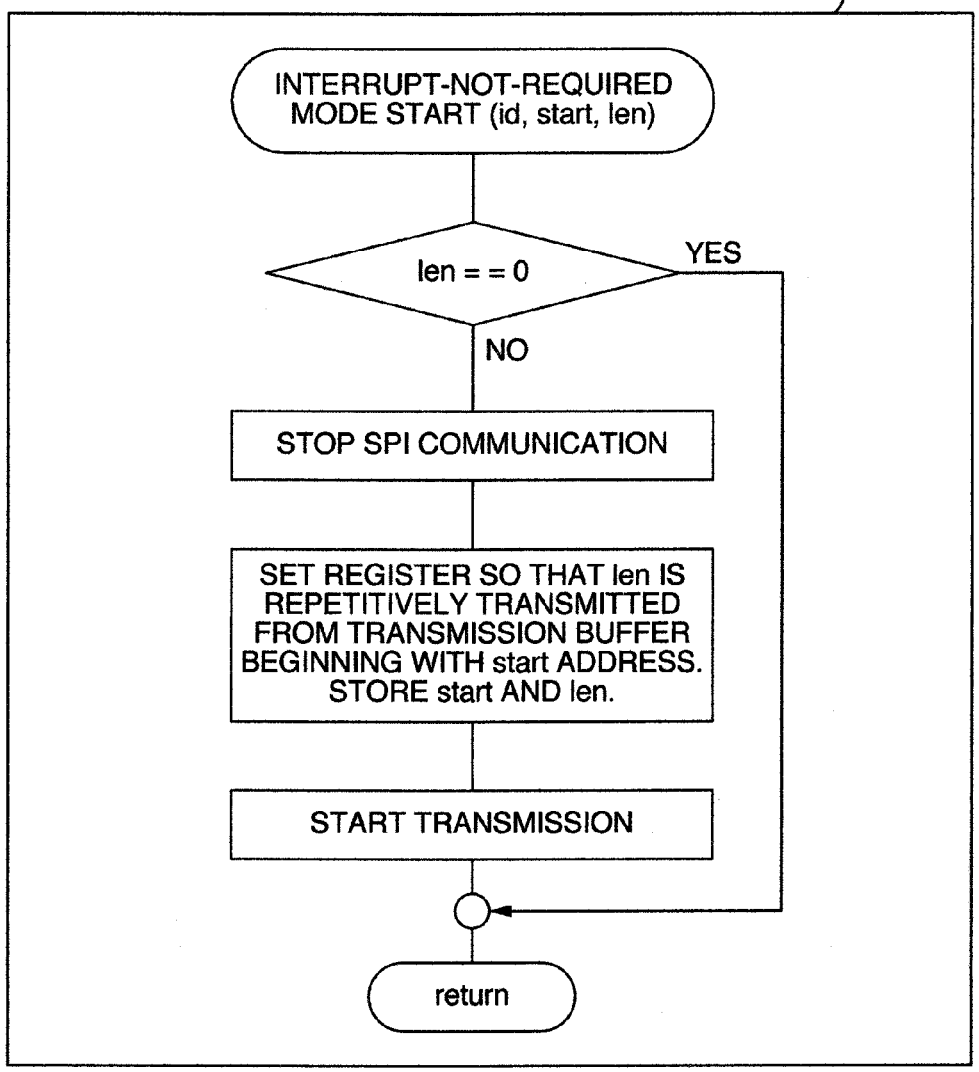
FIG. 9 is a processing flow for starting an interrupt-not-required mode.

FIG. 9 shows a processing flow of the interrupt-not-required mode start. If the specified len is 0, the interrupt-not-required mode operation is ended without performing anything. If len is not 0, the register is so set as to cause the length from start to len to be transmitted repetitively. Then, the communication is started. The start and len thus set are stored.

Figure 10:
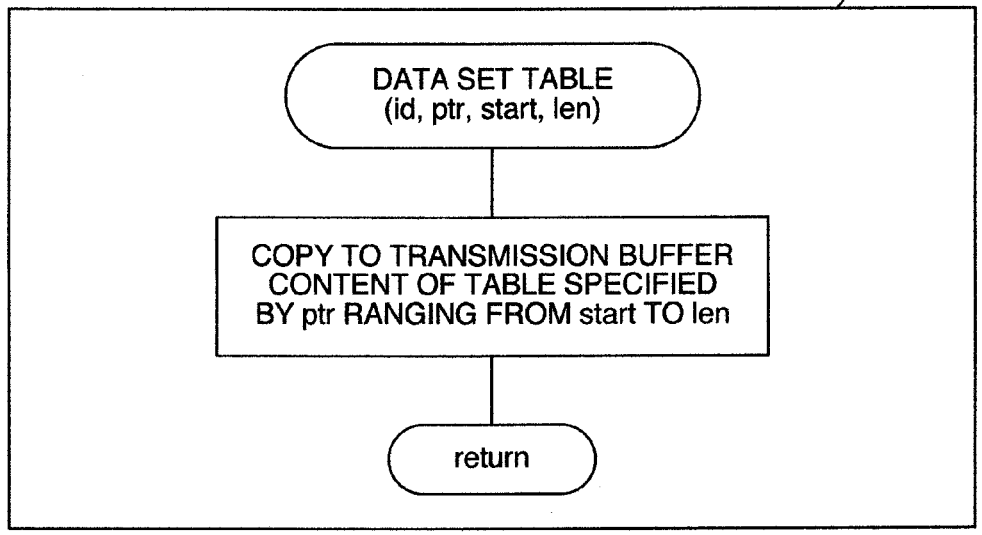
FIG. 10 is a processing flow for a data set table.

FIG. 10 shows a processing flow of the data set table. The specified table content from start address to len is copied to the transmission buffer beginning with a start address.

Figure 11:
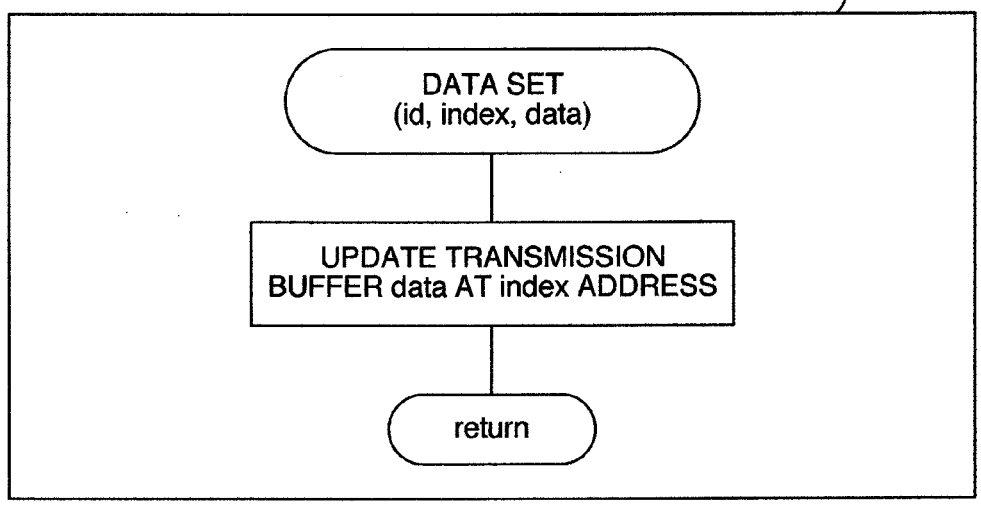
FIG. 11 is a processing flow for a data set.

FIG. 11 shows a processing flow of the data set. Data is updated to the data of the transmission buffer at an index address.

Figure 12:
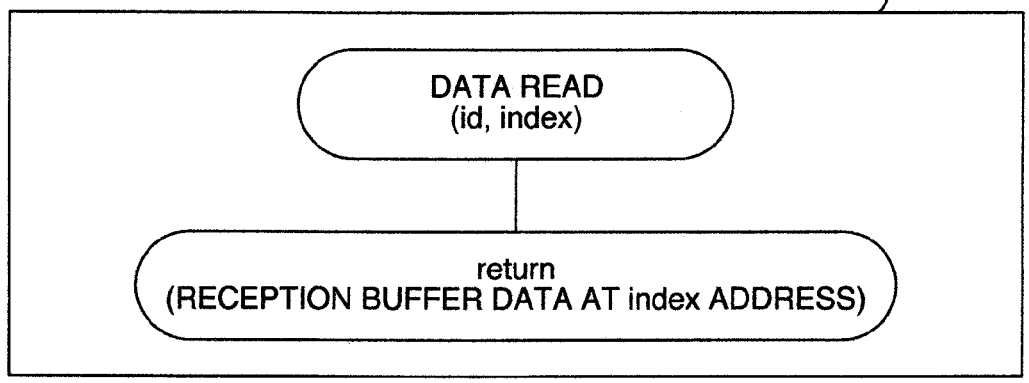
FIG. 12 is a processing flow for a data read.

FIG. 12 shows a processing flow of the data read. Data of the reception buffer at an index address is reported.

Figure 13:
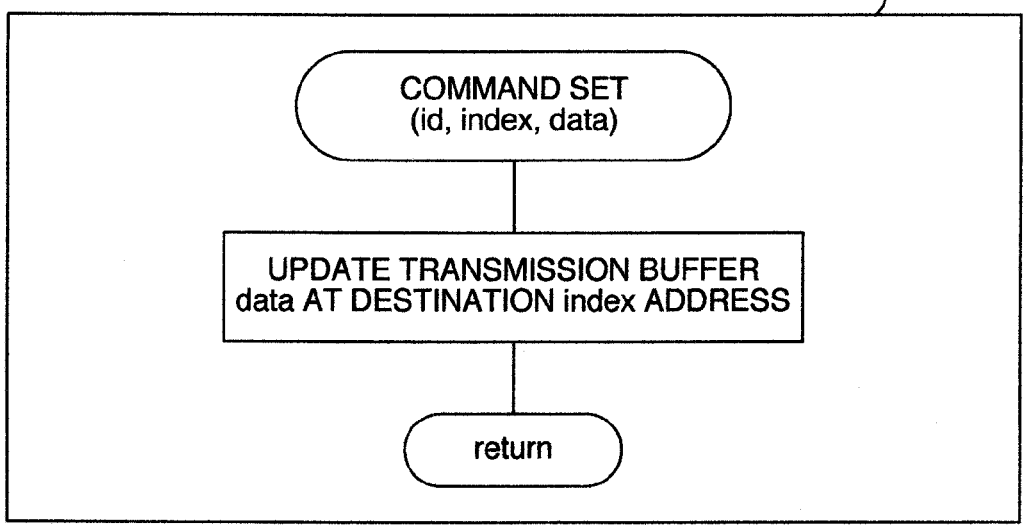
FIG. 13 is a processing flow for a command set.

FIG. 13 shows a processing flow of the command set. Data of the transmission buffer for the destination at an index address is updated.

Figure 14:
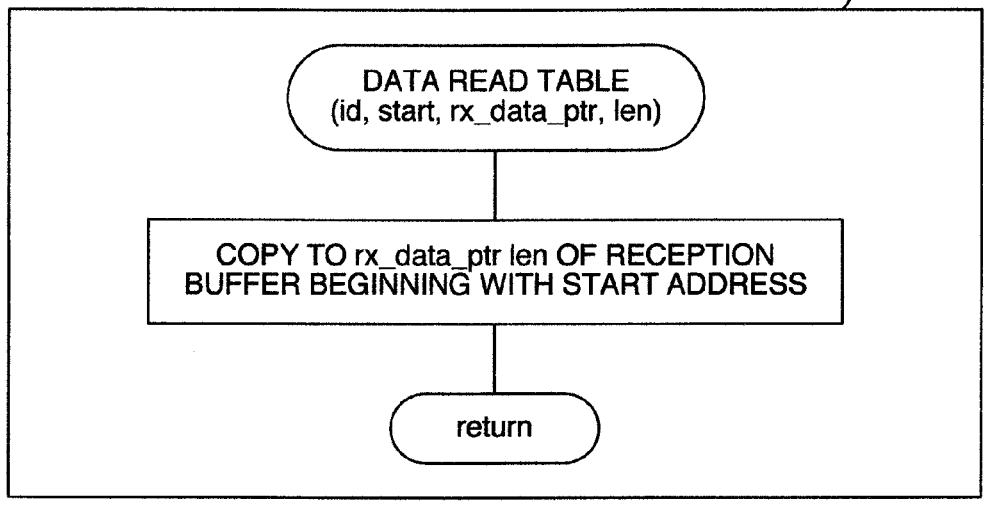
FIG. 14 is a processing flow for a data read table.

FIG. 14 shows a processing flow of the data read table. Data of the reception buffer from the start address to len is copied to rx_data_ptr address.

Figure 15:
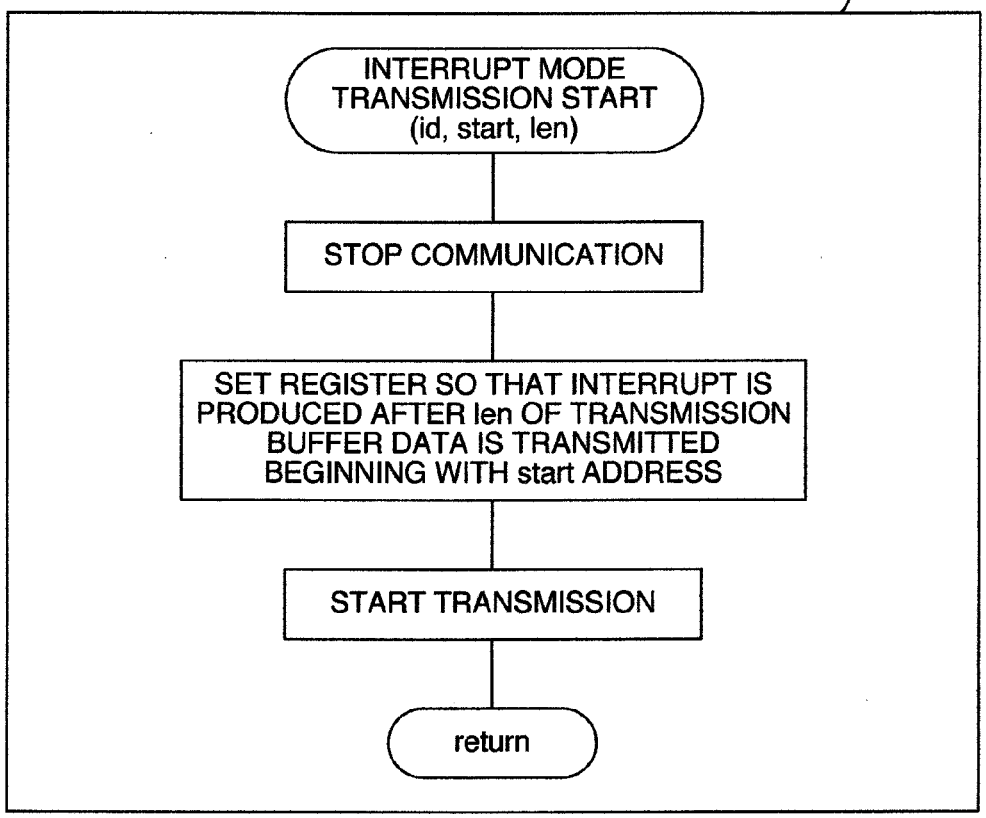
FIG. 15 is a processing flow for starting an interrupt mode transmission.

FIG. 15 shows a processing flow of the interrupt mode transmission start. First, the communication is stopped. Next, the register is so set that the communication will be restarted from the start address of the transmission buffer and that, after the len of data is transmitted, a completion interrupt will come in. Then, the communication is started.

Figure 16:
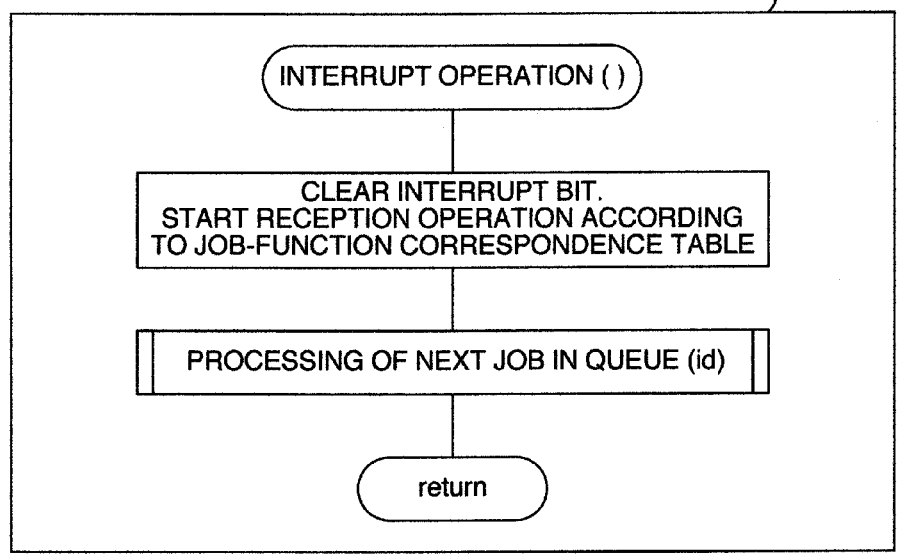
FIG. 16 is a processing flow for an interrupt.

FIG. 16 shows a processing flow of the interrupt operation. The interrupt operation is prepared for each of the modules SPI_1, SPI_2 and SPI_3. First, an interrupt bit is cleared and the reception operation corresponding to the current job is started from the job queue. Then, the next queue operation is started.

Figure 17:
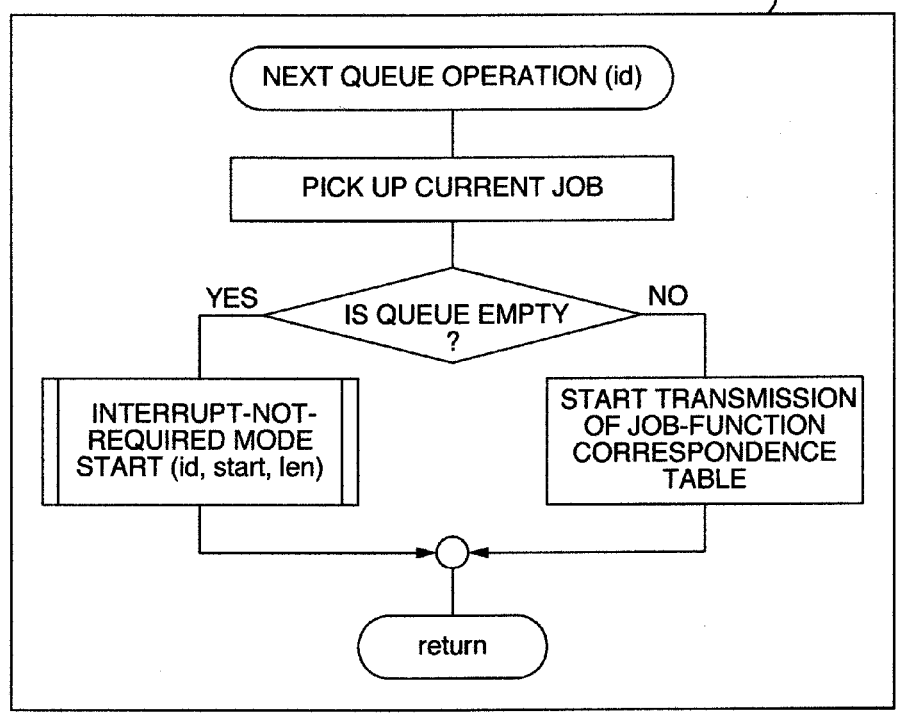
FIG. 17 is a processing flow for the next queue.

FIG. 17 shows a processing flow of the next queue operation. The current job is picked up from the job queue. Next, if the job queue is empty, the interrupt-not-required mode start is executed. At this time, the start and len are given the previously stored values. When the interrupt-not-required mode is not used, as in FIG. 3, an initial value is specified. That is, len=0 and the mode is not switched to the interrupt mode. If the job queue is not empty, the transmission operation for the next job is started.

Figure 18A:
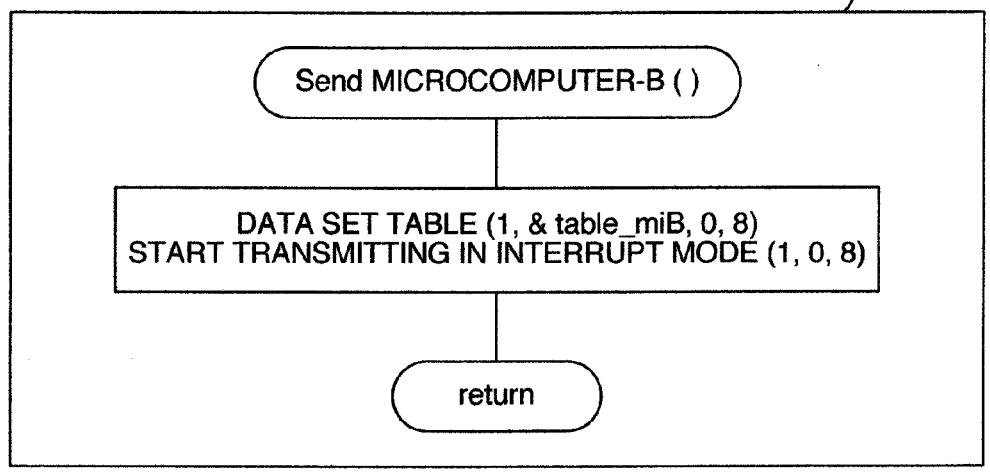
FIGS. 18A and 18B illustrate a processing flow for a Send microcomputer B and a processing flow for an Rx Microcomputer B.
Figure 18B:
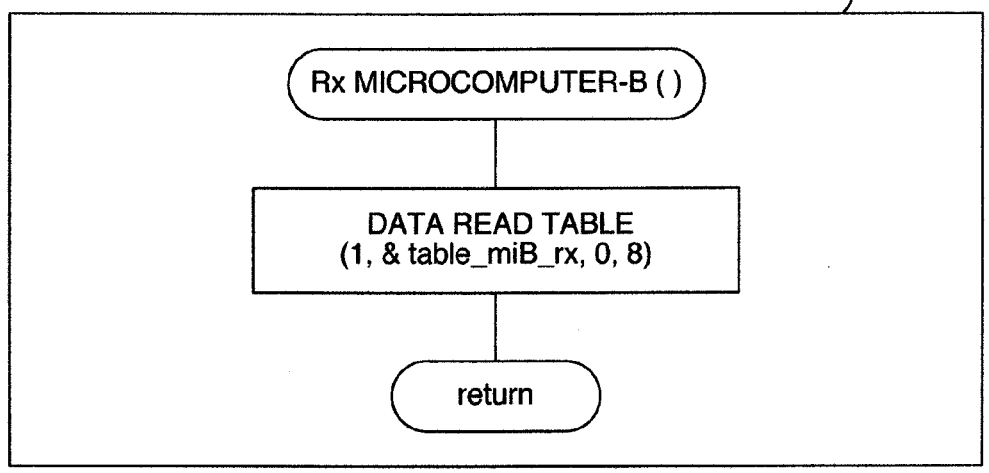

FIGS. 18A and 18B illustrate processing flows of Send Microcomputer-B 1112138, which is the transmission operation for the Job Microcomputer-B, and of Rx Microcomputer-B 1112139, which is the reception operation for the Job Microcomputer-B. The Send Microcomputer-B 1112138 uses a data set table function to set 8-byte data and a transmission destination. The Rx Microcomputer-B 1112139 uses a data read table function to copy the data of the reception buffer to table_miB_rx.

Figure 19A:
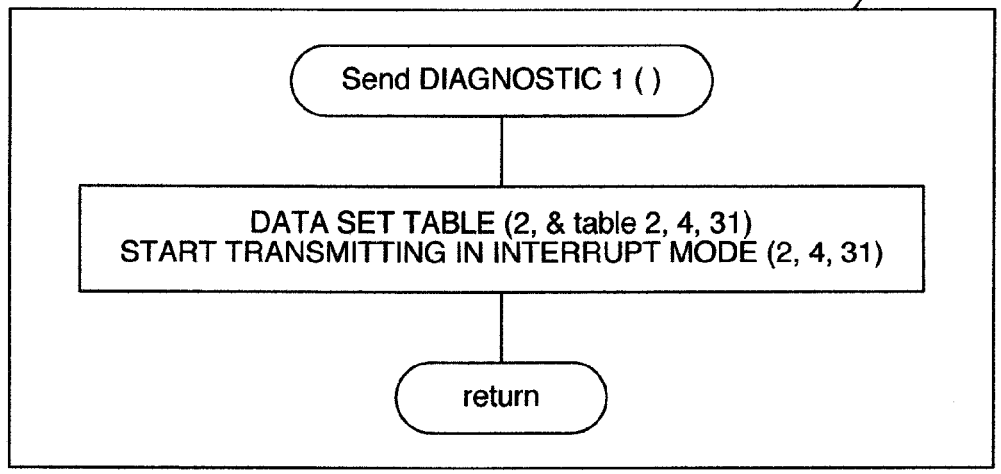
FIGS. 19A and 19B illustrate a processing flow for a Send Diagnostic 1 and a processing flow for an Rx Diagnostic 1.
Figure 19B:
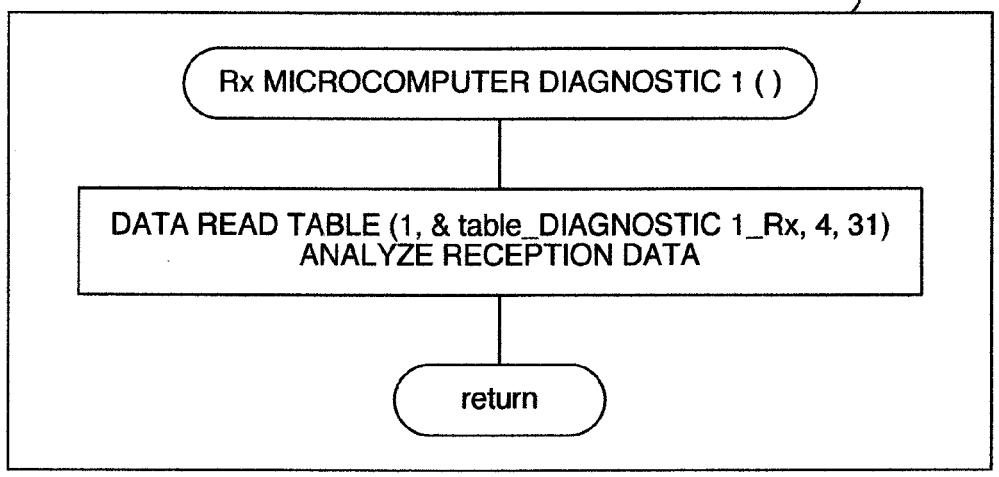

FIGS. 19A and 19B illustrate processing flows of Send Diagnostic 1, which is the transmission operation for the Job Diagnostic 1, and of Rx Diagnostic 1, which is the reception operation for the Job Diagnostic 1. The Send Diagnostic 1 uses the data set table function to set data and a transmission destination and then starts the transmission. The Rx Diagnostic 1 uses the data read table function to copy the data of the reception buffer and performs diagnostic analysis on the data.

Figure 20A:
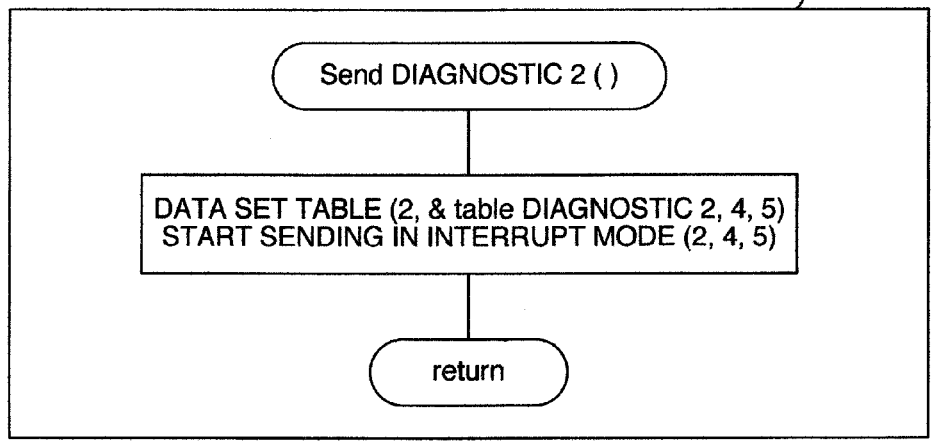
FIGS. 20A and 20B illustrate a processing flow for a Send Diagnostic 2 and a processing flow for an Rx Diagnostic 2.
Figure 20B:
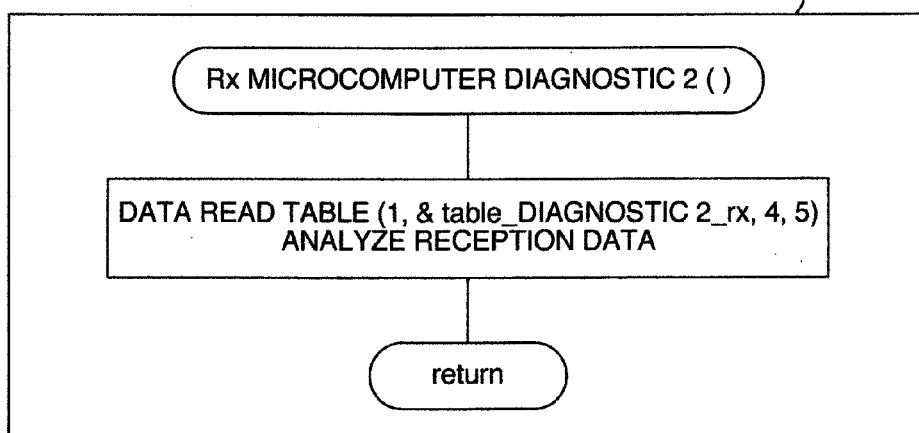

FIGS. 20A and 20B illustrate processing flows of Send Diagnostic 2, which is the transmission operation for the Job Diagnostic 2, and of Rx Diagnostic 2, which is the reception operation for the Job Diagnostic 2. The Send Diagnostic 2 uses the data set table function to set data and a transmission destination and then starts the transmission. The Rx Diagnostic 2 uses the data read table function to copy the data of the reception buffer and performs diagnostic analysis on the data.

The present invention is applicable to control equipment with a built-in communication apparatus, including automotive control equipment.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A control equipment with a communication apparatus comprising:
   a serial communication means to serially communicate with a plurality of destinations, characterized in further comprising:
   a device driver for serial communication which controls serial communication between ICs and determines a mode requiring a reception completion interrupt and a mode not requiring the reception completion interrupt by executing a mode switching process;
   wherein, when the device driver decides that the reception completion interrupt is not necessary, the serial communication means transmits data to one or more first destinations and also virtually transmits data to a second destination different from the one or more first destinations, the second destination being a virtual destination that does not physically exist;
   wherein data are transmitted to the second destination which does not physically exist to secure a predetermined delay time between successive communications to the one or more first destinations; and
   wherein the first destinations are the ICs.

2. The control equipment with communication apparatus according to claim 1,
   wherein, when the device driver decides that the reception completion interrupt is necessary, the serial communication means transmits data to the one or more first destinations and also virtually transmits data to the second destination different from the one or more first destinations.

3. The control equipment with the communication apparatus according to claim 1,
   wherein, when a communication in the reception completion interrupt mode is completed, if a next communication mode is the reception completion interrupt mode, the reception completion interrupt mode is continued without returning to the interrupt-not-required mode and is only switched to the interrupt-not-required mode when there is no communication request for the reception completion interrupt mode.

4. The control equipment with the communication apparatus according to claim 2,
   wherein, when a communication in the reception completion interrupt mode is completed, if a next communication mode is the reception completion interrupt mode, the reception completion interrupt mode is continued without returning to the interrupt-not-required mode and is only switched to the interrupt-not-required mode when there is no communication request for the reception completion interrupt mode.

5. The control equipment with the communication apparatus according to claim 1,
   wherein a communication in the reception completion interrupt mode lasts a predetermined duration and data to be transmitted in the interrupt-not-required mode is transmitted once in the reception completion interrupt mode.

6. The control equipment with the communication apparatus according to claim 2,
   wherein a communication in the reception completion interrupt mode lasts a predetermined duration and data to be transmitted in the interrupt-not-required mode is transmitted once in the reception completion interrupt mode.

7. The control equipment with the communication apparatus according to claim 3,
wherein a communication in the reception completion interrupt mode lasts a predetermined duration and data to be transmitted in the interrupt-not-required mode is transmitted once in the reception completion interrupt mode.

8. The control equipment with the communication apparatus according to claim 4,
wherein a communication in the reception completion interrupt mode lasts a predetermined duration and data to be transmitted in the interrupt-not-required mode is transmitted once in the reception completion interrupt mode.

* * * * *